June 1, 1943.  F. D. BURNS ET AL  2,320,508
STABILIZER FOR CONTROLLERS OR REGULATORS
Filed May 16, 1940  4 Sheets-Sheet 4

INVENTORS.
FRANK DONALD BURNS
WARREN B. THORNE
BY
Altech & Knoblock
ATTORNEYS

Patented June 1, 1943

2,320,508

UNITED STATES PATENT OFFICE 2,320,508

STABILIZER FOR CONTROLLERS OR REGULATORS

Frank Donald Burns and Warren B. Thorne, Michigan City, Ind., assignors to The Hays Corporation, Michigan City, Ind., a corporation of Indiana Application May 16, 1940, Serial No. 335,542

7 Claims. (Cl. 50—10)

This invention relates to a stabilizer for controllers or regulators, and more particularly to the provision of a stabilizer with a controller or regulator for a process being controlled, for example a combustion system.

The primary object of the invention is to provide simple and inexpensive means for rapidly and effectively stabilizing the action of a controller or regulator.

A further object is to provide a device of this character which reduces to a minimum the changes in the setting of a controller or regulator required to effect changes in the process being controlled responsive to variations in operating conditions of the controlled process.

A further object is to provide a stabilizer whose action incident to a change in the setting of a controller or regulator may be adjusted to correspond to the inertia or lag in the process being controlled and thereby reduce to a minimum the operations of the controller.

A further object is to provide means for creating a pneumatic pressure variation in a stabilizing chamber and associated pneumatic system connected with the metering unit of a regulator, incident to the operation of the regulator, and associated means for permitting said pressure variation to "bleed off" in the control system.

A further object is to provide a device for effecting a change in a controlled process very quickly, and for minimizing or preventing "hunting" of the controller or regulator at all times.

A further object is to provide a regulator having a slack diaphragm type of metering device with a stabilizer creating pneumatic pressure conditions exerted on the diaphragm at the metering side thereof.

A further object is to provide a stabilizer which is usable with regulators actuated by variations in differential pressure, or pressure or suction, or flow in a controlled process.

A further object is to provide a stabilizer usable with regulators for controlled process having substantial storage or capacity lag, and/or for controlled systems having excessive pulsations and negligible storage lag.

A further object is to provide a regulator with a stabilizer effective to neutralize inertia in fluid connecting lines, diaphragm chambers, and the like.

Other objects will be apparent from the description and appended claims.

Before describing our invention, attention is directed to the fact that most processes, such as combustion processes etc., are subject to both metering lag and storage or capacity lag. Hence it is customary to provide a regulator which will compensate for the type of lag which is predominant in the particular process to be controlled. As used herein, the terms "metering lag" and "storage lag" will be understood to have the following definitions: "Metering lag" is the time lag in the control system occurring between the metering unit of the control system and the point at which the fluid connection for said metering unit is tapped with the process to be controlled, and also includes lag induced by inertia of mechanical parts directly controlled or operated by the metering unit. "Storage lag" is the time lag in the process to be controlled occurring between the control element therefor, such as a damper in a stack, and the point of the process at which the fluid connection to the metering unit is tapped.

Figure 1:
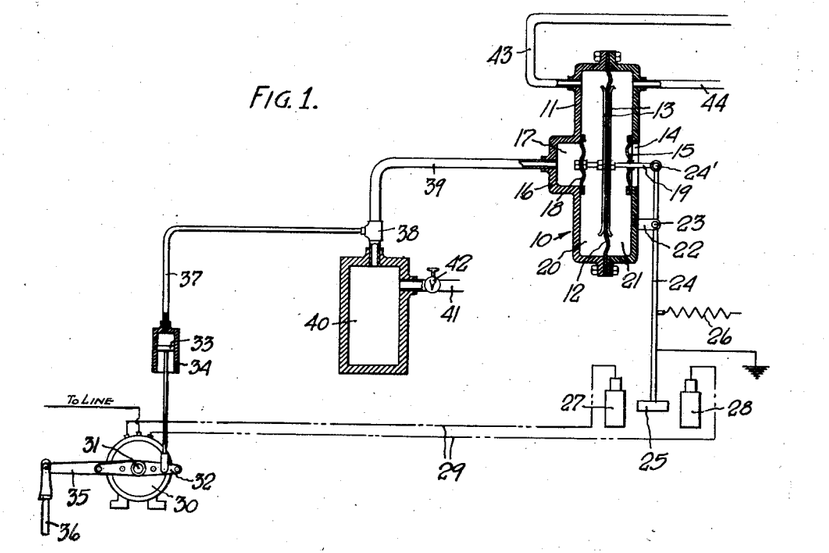
Fig. 1 is a diagrammatic view illustrating one application of the invention to a regulator or controller connected with a process having predominant storage lag to be controlled, for response to variations in differential pressure or flow in said process.
Figures 3, 4:
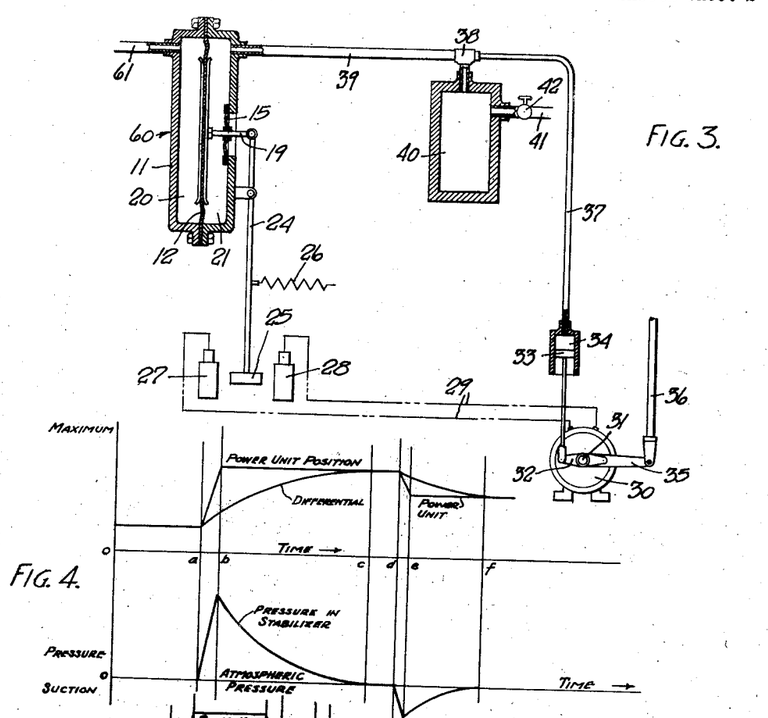
Fig. 3 is a diagrammatic view illustrating our invention applied in a regulator or controller for a process having predominant storage lag, wherein said controller is responsive to variations in pressure in said process.
Fig. 4 is a chart illustrating the operation of the device illustrated in Fig. 1 where the same has been adjusted to give "dead beat" regulation.
Figure 5:
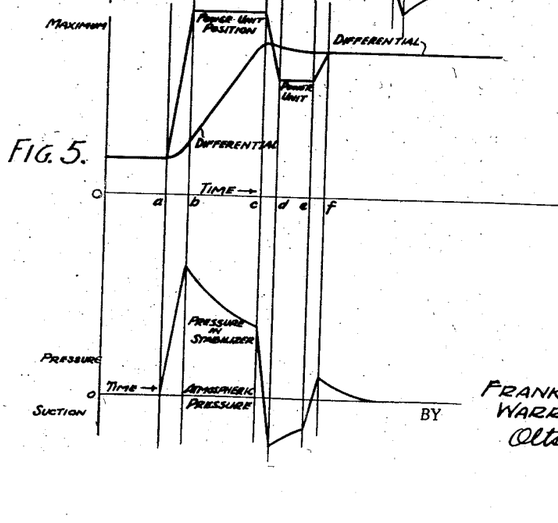
Fig. 5 is a chart similar to Fig. 4, and illustrating another condition of operation of the device illustrated in Fig. 1.

Referring to the drawings, and particularly to Figs. 1, 4 and 5 thereof, the numeral 10 designates a metering unit comprising a housing 11 having a slack diaphragm 12 therein dividing the housing into two substantially equal compartments. The margin of the diaphragm 12 is rigidly clamped between complementary parts of the housing, and the intermediate portion of the diaphragm 12 is reinforced by a pair of metal plates 13 secured in face engagement therewith. An opening 14 is formed centrally in the housing at one side thereof, and this opening is closed by a suitable slack diaphragm 15. The opposite side of the housing 11 includes an offset portion 16 defining a chamber 17 which is sealed from the main body of the housing 11 by a slack diaphragm 18. A rod 19 extends transversely of the diaphragms 12, 15 and 18, and each of said diaphragms is rigidly secured to said shaft at spaced points along the length thereof, said connections being such that no leak is permitted in any of the three diaphragms or between the following: chamber 17, chamber 20 between diaphragm 18 and diaphragm 12, and chamber 21 between diaphragm 12 and diaphragm 15. A suitable projection or arm 22 is carried by casing 11 at the side thereof adjacent opening 14 through which the rod 19 projects. This arm 22 has pivoted thereto at 23 a weighbeam 24 whose upper end is pivotally connected with the outer end of rod 19 at 24'. The lower free end of the weighbeam 24 carries a magnet 25. A tension spring 26 is connected with an intermediate portion of the weighbeam 24, and is suitably connected by an operating element, such as a master steam meter, in the system to be controlled. It will be understood, of course, that other means than a spring may be utilized as a loading means for applying force responsive to a change in the process to be controlled.

A pair of mercury switches 27 and 28 or other suitable electric contacts are positioned on opposite sides of the magnet 25 or a common contact in equi-spaced relation thereto when the weighbeam is in neutral position, said mercury switches each being positioned in the path of pivotal movement of said weighbeam. Each of these switches is connected by suitable electric connecting lines 29 with a power member 30, here illustrated as a motor.

It will be understood, of course, that any suitable power member, or positioning member which may be found desirable, may be employed. The power member 30 serves to operate a shaft 31 which carries an arm 32 fixed thereon. A link 33 is pivotally connected to the arm 32 and constitutes a connecting rod between arm 32 and a piston 33 mounted in a cylinder 34. One end of the cylinder 34 is preferably open to atmosphere. Shaft 31 also rigidly mounts a lever arm 35 which is pivotally connected with a member 36 adapted for control of some element of the process to be controlled. For example, the link 36 may serve to operate a valve or a rheostat in the process being controlled.

The closed end of cylinder 34 has a tube 37 connected thereto, and this tube 37 leads to a T-fitting 38 connected in a line 39. One end of the line 39 leads to a stabilizing chamber 40, and the other end of line 39 communicates with chamber 17 of the metering unit 10. The stabilizing chamber 40 has a conduit 41 connected therewith, and an adjustable valve 42 is interposed in conduit 41. The outer end of conduit 41 is preferably open to atmosphere.

A conduit 43 serves to connect the chamber 20 of the metering unit 10 with the high pressure side of the process to be controlled, and a conduit 44 serves to connect the chamber 21 of the metering unit 10 with the low pressure side of the process to be controlled. The conduits 43 and 44 constitute differential pressure connections, and are preferably disposed on opposite sides of an orifice plate in a conduit or duct of the process to be controlled, as is well understood in the art.

The operation of the device will be explained as applied to a fan for regulating the air flow from a turbine driven fan wherein the speed of the turbine and fan (not shown) are controlled by the throttling steam valve (not shown), of the turbine. In this connection, it will be understood that the conduits 43 and 44 are connected with the air duct at opposite sides of an orifice plate therein to measure the air flow in the duct by measurement of the pressure differential on opposite sides of the orifice. In this application of the invention, when the loading of the sensitive diaphragm of metering unit 10 is increased by additional tension in spring 26, or the relation between diaphragm 12 and spring 26 is otherwise unbalanced, as by a change in the differential pressure in the lines 43 and 44, the weighbeam is operated to swing the magnet 25 toward the right, as viewed in Fig. 1. As the magnet 25 approaches the mercury switch 28, it serves to actuate said switch and thus close one of the operating circuits for the electrical power member 30. The member 30 rotates the shaft 31 in counterclockwise direction as best illustrated in Fig. 1 to operate the link 36 controlling the throttle valve. At the same time, the rotation of shaft 31 also swings arm 32 in counterclockwise direction and thus forces the piston 33 to move within cylinder 34, for the purpose of increasing the air pressure within the cylinder 34, stabilizing chamber 40, lines 37 and 39, and chamber 17 of the metering unit. The increase in pressure in chamber 17 of the metering unit acts upon the diaphragm 18 and its effect is transmitted through the rod 19 to the weighbeam 24 to balance the spring 26, swing the weighbeam to neutral position, render the magnet 25 inoperative with respect to the switches 27 and 28, break the contact in switch 28, and stop the power member 30. It will thus be seen that the movement of controller 36 produced by the operation of the metering unit is only of proportional duration, since the metering unit itself is counterbalanced to stop the power member which operates the controller 36 in a time proportional to the deviation of a variation from a set point or standard. This substantially stabilizes the throttle valve against overrunning if dead beat regulation is desired, or if "hunting" regulation is desired for greater speed of response, insures progressive reduction in amplitude of the process deviation.

It will be obvious that the turbine and fan have substantial inertia, and therefore the speed thereof will not increase to the new desired speed as metered by the differential pressure in lines 43 and 44 immediately after the throttle valve has been opened to its new position or setting. However, the speed of the turbine and fan increase responsive to the new position or setting of the controlling means therefor, and the differential pressure in lines 43 and 44 likewise increased to make the diaphragm 12 exert increasing force on the weighbeam 24 in the same direction as the stabilizing diaphragm 18, thus supplementing the action initiated by the increased air pressure within chamber 17 of the metering unit. During the period required by the turbine and fan to attain the speed corresponding to the new throttle valve setting, the bleed valve 42 in conduit 41 permits the pressure within the stabilizing chamber 40 to "bleed off." The adjustable character of the bleed valve permits this "bleeding" of pressure from the stabilizing chamber 40 to occur at the same or a lower rate of speed than that of the increase in the differential across the main diaphragm 12. Thus it is possible to adjust the valve 42 so that the turbine and fan will reach their new speed corresponding with the setting of the throttle by member 36 at the same time the pressure in the stabilizing chamber 40 and its connected system, i. e. cylinder 34, chamber 17 and lines 37 and 39, becomes atmospheric. In this way, the decrease in the pressure in chamber 17 during the "bleed" action is complemented by the increase in pressure in chamber 20 incident to the increasing differential in lines 33 and 34.

When the pressure in stabilizing chamber 40 and its connected system becomes atmospheric, the forces then acting upon the weighbeam 24 are the same as at the beginning of the operation. Namely, the tension of spring 26 acting in one direction, and the forces exerted upon the diaphragm 12 and transmitted thereto by the lines 43 and 44 in opposition to the tension of spring 26, are balanced.

When the tension on the loading spring 26 is decreased, as when turbine and fan speed are to be decreased, the operation is the reverse of that above described, with the weighbeam 24 swinging to a position adjacent switch 27 for the purpose of actuating the power member 30 in a direction, such as a clockwise direction as illustrated in Fig. 1, to move the members 35 and 36 controlling the throttle valve toward closing position. At the same time, the arm 32 on shaft 31 is also moved in clockwise position as viewed in Fig. 1, thus drawing the piston 33 toward the outer end of the cylinder and creating a decrease in pressure in the cylinder 34, stabilizing chamber 40, chamber 17 and lines 37 and 39 below atmospheric pressure. This sub-atmospheric pressure in the system, and particularly in chamber 17, acts upon the stabilizing diaphragm 18 to shift the weighbeam 24 to neutral position, and thereby again stop the operation of the power member 30 by breaking contact in switch 27. Thereupon, the bleed valve 42 permits the stabilizing chamber 40 to take in air, to again neutralize the pressure in the stabilizing chamber 40 and its connected system at atmosphere.

The operation of the device may be adjusted entirely by adjusting the setting of the bleed valve 42. Thus, for example, the valve may be adjusted to give "dead beat" regulation as shown in the graph, Fig. 4. From this graph it will be noted that upon an increase in the tension exerted on spring 26 at time a, the throttle valve is moved by member 36 under the control of power member 30 until time b, when the stabilizing pressure developed in the cylinder 34 by piston 30 is transmitted to chamber 17 of the metering unit and acts against the stabilizing diaphragm 18 to restore the weigh beam 24 to neutral position. The position of the throttle valve and of power unit 30 then remains constant until time d, by virtue of the complementary effect of increasing differential pressure from lines 43 and 44 and decreasing pressure in the stabilizing system incident to the "bleed" through valve 42. The time c marks the point at which the metering unit is again influenced solely by the main diaphragm 12 and the loading spring 26. Operation of the turbine and fan may then continue constant from time c to time d, at which latter time the tension on spring 26 is decreased, causing the power member 30 to operate the members 35 and 36 for control of the throttle valve in closing direction until a reduction in pressure occasioned by operation of the piston 33 in cylinder 34 is transmitted to the metering unit chamber 17 to cause the stabilizing diaphragm 18 to act in opposition to the original actuating condition and thereby again restore the weigh beam 24 to neutral position. The resulting change in the differential pressure extends from time d to time f, during which interval the bleed of air into the stabilizing chamber 40 and connected system occurs. Thus, beginning at time f, the stabilizing system is inoperative, and the regulator is again restored to control solely by the main diaphragm 12 and loading spring 26.

A slightly different operation can be achieved by varying the proportion or setting between the cylinder 34 and stabilizing chamber 40, so that the throttle valve actuated by the members 35 and 36 responsive to the movement of the power member may overtravel, and thereafter return to final position in one or two movements. The graph of such a setting is illustrated in Fig. 5, wherein the power unit is set to move between times a and b, and then remain constant to time c, during which interval the pressure in the stabilizing system falls off. A reversing operation of the regulator occurs at time c to reposition the throttle valve at a reduced feed setting, in connection with which the pressure in the stabilizing system falls below atmosphere as above explained between time c and d, followed by a period of operation of the power unit at the reset position between times d and e. There then follows a new setting of the power members in increasing direction between times e and f. The differential pressure will thus be seen to increase until it exceeds the desired setting at time c, whereupon it returns in a gradual movement to the desired differential at time f. The two graphs illustrate that the stabilizing system on the control or regulator can be adjusted by means of adjustment of valve 42 to permit the regulator to change the speed of the turbine and fan very quickly. Also, though the throttle valve may be observed to "hunt," the hunting amplitude diminishes with each cycle and the regulator may be said to be stable.

Figure 2:
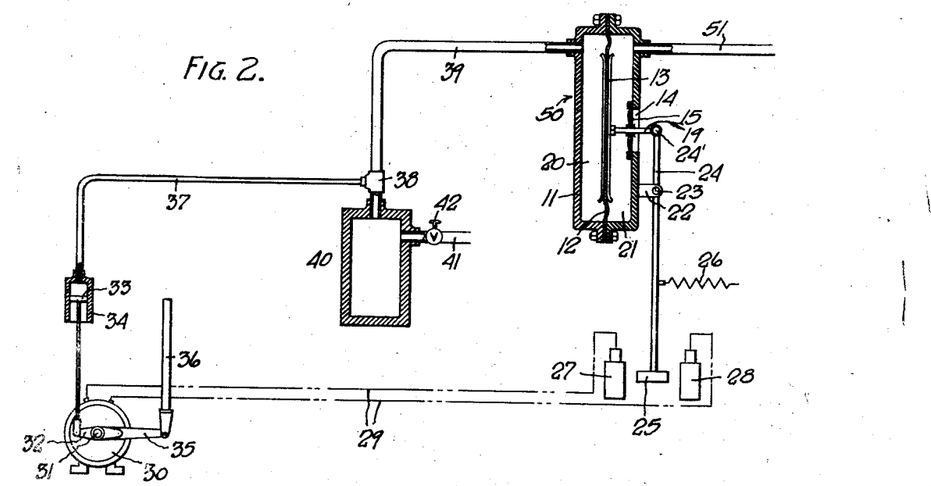
Fig. 2 is a diagrammatic view illustrating the application of our invention in a controller or regulator connected to a process having predominant storage lag, for response according to variations in suction or draft in said process.

In Fig. 2 embodiment is illustrated a modified application of our invention, connected with the suction or draft line of a process to be regulated. In this and each of the other drawings, the parts corresponding to those shown in Fig. 1 are designated by the same reference numerals.

It will be noted particularly that the metering unit 50 in this device comprises merely the main diaphragm casing 11 containing the diaphragm 12 which divides the casing 11 into opposed chambers 20 and 21. One side of the casing has the central opening 14 receiving the atmospheric diaphragm 15, which is preferably of negligible area, and the rod 19 is rigidly secured to both diaphragms 12 and 15 in spaced relation. In this embodiment, the line 39 between the stabilizing chamber 40 and the metering unit 50 communicates directly with chamber 20 of the unit. A draft or suction line 51 extends from the process to be controlled for communication with the chamber 21 of metering unit 50, and the adjusting spring 26 is positioned to be normally in opposition to the force exerted upon diaphragm 12 by the suction in line 51. The stabilizing chamber 40 has a conduit 41 open to atmosphere and controlled by bleed valve 42. Likewise all other parts of the Fig. 2 device, including the switches 27, 28, the weigh beam 24 carrying a magnet 25, the power member 30, the controller 36 for the system to be operated, and the piston and cylinder arrangement are the same as in the preferred embodiment.

In operation, when a setting of the device occurs under the influence of the spring 26 to operate the power member 30 in increasing direction, the stabilizer generates and transmits to the metering unit 50 through line 39, a pneumatic pressure which acts upon the diaphragm 12 in opposition to the spring 26 and in complementary relation to the suction in the line 51, so as to permit the combined pressure in chamber 20 and suction in chamber 21 quickly to stabilize any increase in tension in spring 26. Likewise, upon reverse operation, by an increase in suction in line 51 which overbalances spring 26, the device is operated to close the circuit in decreased pressure direction at switch 27, and thereby operate the power member and stabilizer to reduce to a point below atmosphere the air pressure within the stabilizing system. The suction is transmitted to chamber 20 and complements spring 26 in opposition to the suction in line 51 which initiated the actuation of the regulator.

The Fig. 3 embodiment of the invention illustrates a metering unit 60 of the same type as unit 50, but wherein the chamber 20 of the unit has a direct connection with a line 61 to a pressure source within the process to be controlled. The line 39 from the stabilizing system communicates with the chamber 21 of the metering unit for opposed relation to pressure line 61. All other parts of the system are substantially the same as the Fig. 2 embodiment, and bear the same reference numerals by which the same parts have previously been identified herein.

The operation of the stabilizer in this embodiment will readily be understood as follows: An increase in the tension of spring 26 to overcome the balance normal between the same and the pressure in line 61 as applied to the diaphragm 12, serves to swing the weighbeam 24 and magnet 25 for closing the increase switch 28 to move the power member in increase direction and to simultaneously create a sub-atmospheric pressure in the stabilizing unit. The sub-atmospheric pressure or suction acts upon the diaphragm 12 in opposition to the spring 26, and serves to complement the pressure exerted upon diaphragm 12 through line 61, and thus to reestablish balanced condition of the weighbeam.

It will readily be seen from the above that in each of the embodiments illustrated in Figs. 1, 2 and 3, the regulator may be operated to quickly shift the control element of the process being regulated, and the stabilizer unit simultaneously comes into play to quickly stop the regulator and the control element of the system being regulated before the latter reaches speed or other condition for which its control has been set. Thus the stabilizer compensates for the storage or capacity lag which may be inherent in the nature of the process being regulated and stabilizes the operation of said process. In each of these embodiments, the slack diaphragms 12, 15 and 18 are so connected that the slack is removed by pressure on the metering side of the diaphragm. This is quite important in a device of this character, since if the slack were allowed to "billow" with changes in pressure in the metering unit, especially when close to zero, the suitability of the stabilizer would be somewhat impaired, though it would still be satisfactory for some purposes.

Figure 6:
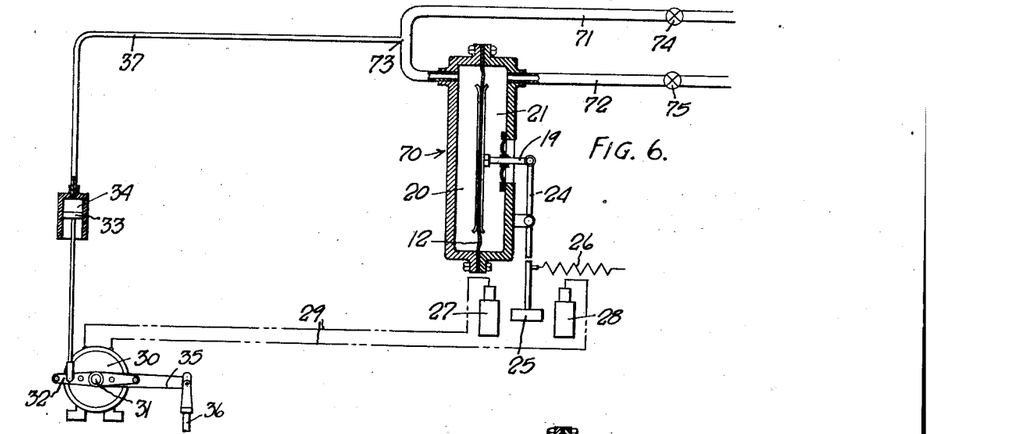
Fig. 6 is a diagrammatic view illustrating a modified embodiment of our invention applied to a regulator for a process having predominant metering lag to be controlled, wherein the regulator operates responsive to variations in flow or differential pressure in said process.

In the embodiment illustrated in Fig. 6, a metering unit 70 of the same type as illustrated in Figs. 2 and 3, is employed in connection with a differential pressure application wherein line 71 constitutes the high pressure connection, and line 72 constitutes the low pressure connection with the process being regulated. Furthermore in this arrangement, the stabilizing chamber 40 of the previous embodiments is entirely eliminated, and the conduit 37 leading from the stabilizing cylinder 34 is connected directly with the conduit 71 and 73. A stabilizing adjustment valve 74 is interposed in the high pressure line 71 and the dampening valve 75 is interposed in the line 72. Thus when the system is used to regulate air flow through a duct or boiler, the air flow being controlled by a damper connected with controller 36 and being measured by a suitable differential pressure means such as an orifice plate in the duct, the following operation occurs: When more air flow is required, the tension on spring 26 is increased by external means constituting a part of the process to be controlled, and shifts the weighbeam 24 in increasing direction to position its magnet 25 in operative relation to increase switch 28. This closes a circuit to the power member 30 for operation thereof in increase direction, for example, clockwise direction. At the same time, the arm 32 is operated by the power member 30 to operate the piston in cylinder 34 to increase the pressure therein and apply said pressure to the line 71 and the chamber 20 of the metering unit, to complement the pressure in line 71 and thus again establish a balanced relation of the diaphragm 12 as against the setting of the spring 26 which initiated the operation. The valve 74 in the high pressure connecting line 71 is set in partially closed position as desired, so that the air flow therethrough incident to the increase in air pressure supplied from cylinder 34 by line 37 is slow. However, the excess or preloading pressure from cylinder 34 is soon dissipated through valve 74, and the pressures in the diaphragm chambers 20 and 21 return to the true pressures in the process to be controlled. In cases where the processes are pulsating excessively, both chambers 74 and 75 may be partially closed to dampen out the pulsations and thus prevent excessive operation of the metering unit 70 and of the power unit 30. However this valve positioning will not add any metering lag to the regulation.

The device will operate satisfactorily even when metering lag is interposed in the line 72 as by partial clogging thereof with duct or foreign matters. In some instances, the lines 71 and 72 will be of great length, and hence the inertia of the columns of air in these lines becomes additive to the inertia of the diaphragm and its connecting mechanism. It will be noted that the air in line 71 beyond point 73 moves in a single direction after the contact has been made, and does not have to reverse when the diaphragm moves to balance the spring 26 and break the circuit to the power member 30. Thus the inertia of the column of air in one line has been eliminated and only the inertia in the other line 72 is effective. However, since added power is available, the effect of this inertia in line 72 is practically neutralized.

Figure 7:
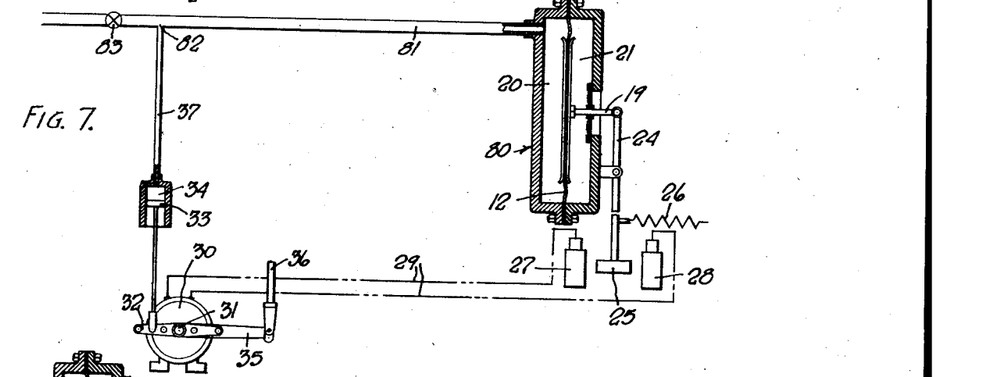
Fig. 7 is a diagrammatic view of a modified application of our invention to a controller connected for operation responsive to variations in pressure in a process having predominant metering lag.

The Fig. 7 embodiment utilizes a metering unit 80 of the same type as unit 70, having a pressure line 81 connected with the chamber 20, and having line 37 from cylinder 34 connected with line 81 at 82. An adjustable bleed valve 83 is interposed in line 81 at the side of connection 82 opposite the metering unit. The operation of this device will be readily understood from the previous description of the Fig. 3 embodiment, and it will be seen that this arrangement permits the positive pressure in the stabilizing cylinder 34 to be additive to the pressure in line 81 for the purpose of counter-balancing spring 26, or to be negative pressure which subtracts from the pressure in line 81, if the latter initiated the operation of the regulator.

Figure 8:
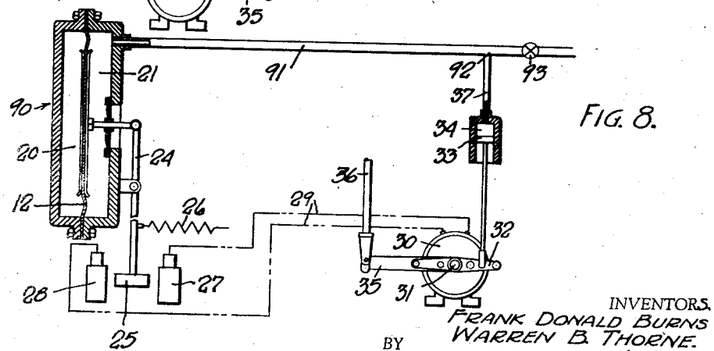
Fig. 8 is a diagrammatic view illustrating a modified application of our invention to a regulator or control connected to a process having predominating metering lag for operation responsive to variations in suction or draft in said process.

The embodiment illustrated in Fig. 8 utilizes a metering unit 90 similar to units 70 and 80. In this embodiment, a suction or draft line 91 is connected for communication with chamber 21, and in turn has line 37 from stabilizing cylinder 34 connected thereto at point 92. Adjustable bleed valve 93 is interposed in line 91 remote from metering unit 90 with respect to point 92. The operation of this embodiment will be readily understood, particularly with respect to the embodiment illustrated in Fig. 2. Specifically, when draft is to be increased, operation of the regulator is initiated by spring 26 and a suction will be created by stabilizing cylinder 34 to complement the suction in line 91 for the purpose of quickly balancing the spring 26. In instances where the draft is to be lowered, a positive pressure is created in line 37 to reduce the effect of the initial suction in line 91 to a point in balance with the setting of spring 26.

In each of the Fig. 7 and Fig. 8 embodiments, the use of a single fluid pressure line from the unit to be regulated and the connection of the stabilizer with said line completely neutralizes the inertia of the air in said line, and hence renders the device rapidly responsive despite existence of metering lag incident to the length of the line to the metering chamber. Also, in each of these embodiments, the bleed valves 83, 93, respectively, may be set to eliminate the undesired pulsations in the process to be controlled.

While the stabilizing system has been herein described and illustrated in connection with pneumatic devices, it is not confined thereto and with obvious changes in small mechanical details to correspond to the type of systems desired, it may be rendered applicable to systems or processes operating on fluids of any nature.

Also, although a diaphragm type of metering unit has been described and illustrated, any other type of measuring and regulating unit may be stabilized by apparatus including the stabilizing system herein described.

Figure 9:
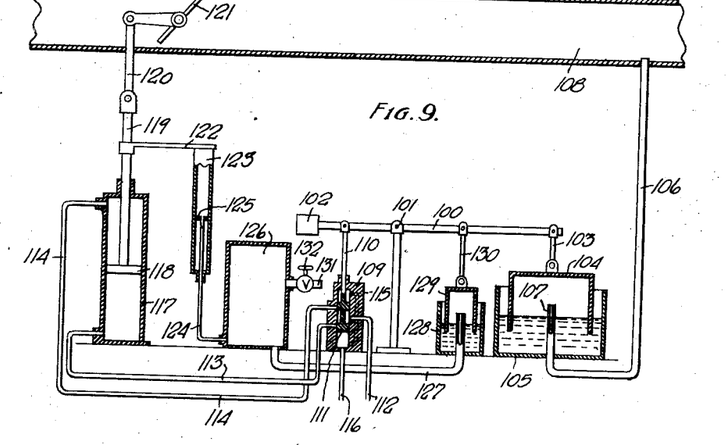
Fig. 9 is a diagrammatic view of another modified embodiment of our invention.

The Fig. 9 embodiment of the invention illustrates the manner in which the same may be used in a non-electrical system. In this application a weighbeam 100 is pivoted on a suitable support at 101, and is acted upon by a suitable loading element here shown as a weight 102. The end of weighbeam 100, opposite loading element 102, has a connection 103 with an inverted bell 104 extending into a liquid container 105. A suitable line 106 extends upwardly through the container 105 and beneath the bell 104 at 107, and the opposite end of line 106 communicates with a duct 108 in the process to be controlled. In this embodiment it will be seen that the metering unit constitutes an inverted bell which acts upon the weighbeam in opposition to the loading element 102 in substantially the same manner in which the metering element, weighbeam and loading element cooperate in the previous embodiments.

A suitable four way valve 109 has its plunger connected by shaft 110 with the weighbeam 100 on the side thereof adjacent the loading element 102. The valve plunger 111 is of a type to control a flow of compressed air or other actuating fluid supply from line 112 selectively to lines 113 or 114. A drain by-pass 115 is provided in the valve 109 and a drain line 116 extends from the lower end of the valve 109. A power cylinder 117 has line 113 connected at one end thereof and line 114 connected at the other end thereof. The piston 118 is mounted on a rod 119 which is connected with suitable linkage 120 for operating a control element in the process to be controlled, which control element may constitute a damper 121. An arm 122 extends from the shaft 119 of the power piston and carries a stabilizing cylinder 123 which is shiftable therewith. A stationary fluid line 124 mounts a stationary piston 125 having an opening therethrough communicating with the line 124. It will thus be seen that if the power piston 118 is operated, the cylinder 123 is caused to shift relative to the stationary piston 125 and thereby create a stabilizing pressure condition. Line 124 extends to and communicates with a stabilizing chamber 126 which is in turn connected to a line 127 which extends into a liquid container 128. An inverted bell 129 is mounted in vessel 128 and has a connection 130 with the weighbeam 100 on the side of the weighbeam pivot 101 adjacent the inverted bell 104. A bleed line 131 extends from the stabilizing chamber 126 and has an adjustable valve 132 interposed therein.

Assuming that the device of Fig. 9 is intended for a draft installation having predominant storage lag, it will be seen that when a condition of unbalance, as between the inverted bell 104 and the loading element 102 occurs, the weighbeam 100 will pivot commensurate to the variation and cause the valve plunger 111 to be deflected. If this deflection is caused by a reduction in draft which permits loading element 102 to force the piston plunger downwardly, connection will be established between the compressed air line 112 and the line 113 connected with the lower end of the power cylinder 117. This will in turn cause an upward movement of the power piston 118 and raise the stabilizing cylinder 123 thereby creating a sub-atmospheric condition in the stabilizing cylinder 123, line 124, stabilizing chamber 126 and inverted bell 129 which complements the reduction in draft effect upon the inverted bell 104 and coincidentally opens the damper 121. The combined effects of bells 104 and 129 balance the loading element 102 and restore the valve piston 111 to neutral position as shown.

The new setting of the damper 121 increases the draft, and as the draft effect is increasing and is being transmitted to inverted bell 104 through line 106, the pressure condition in the stabilizing chamber 126 and connected parts is being dissipated by intake of air at conduit 131 under the control of the valve 132. The valve setting will determine the rate of air intake, and hence compensate for the storage lag as will be obvious.

It will readily be seen that in addition to the non-electrical character of the device, this embodiment differs from previous embodiments by the introduction into the system of the secondary stabilizing inverted bell 129 which constitutes an element separate from the metering unit 104, but acts upon the weighbeam 100 to complement either the metering unit 104 or the loading unit 102 according to the condition of the variation in the process to be controlled.

Figure 10:
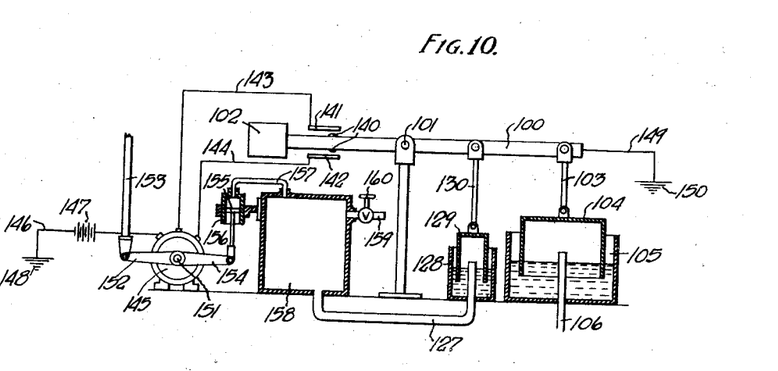
Fig. 10 is a diagrammatic view of still another embodiment of our invention.

In Fig. 10 a system somewhat similar to that in Fig. 9, but operating electrically is disclosed. In this system the metering unit constitutes the inverted bell 104 mounted in the liquid vessel 105 controlled by the line 106. Bell 104 has connection 103 with weighbeam 100 which is pivoted intermediate its ends at 101, and has a loading element 102 acting upon its opposite end. A stabilizing inverted bell 129 is connected at 130 with the weighbeam adjacent the metering unit 104, said inverted bell 129 extending into a liquid vessel 128 with which a stabilizing conduit 127 communicates. The weighbeam 100 is interposed in a suitable electrical system for which purpose it mounts contacts 140 with respect to which switch elements 141 and 142 are positioned on opposite sides of the weighbeam and in the path of travel thereof, said switch elements 141, 142 preferably being flexible and being electrically connected by means of leads 143 and 144, respectively, of an electric positioning motor 145 which has another lead 146 connected with a source of current 147, said lead 146 being grounded at 148. The circuit to the weighbeam is completed through line 149 grounded at 150. Positioning motor 145 has an operating shaft 151 on which is mounted an arm 152 connected with a suitable member 153 adapted for connection with a control element in the process to be controlled, such for example as a damper. Shaft 151 also mounts an arm 154 which has connected thereto a suitable rod carrying a piston 155 mounted in a stationary cylinder 156 open to atmosphere at one end. A line 157 extends from the closed end of cylinder 156 to a stabilizing chamber 158 which is in turn connected with the stabilizing bell 129 by conduit 127. Stabilizing chamber 158 has a conduit 159 open to atmosphere with a control valve 160 interposed therein.

The operation of this device is the same as in the preferred device, it being understood that when the weighbeam 100 is unbalanced, contact will be made with one of the switch elements 141, 142, and the motor caused to operate in a direction to control the power member 153, and also to actuate the piston 155 for the purpose of creating a stabilized pressure condition in stabilizing bell 129 and stabilizing chamber 158.

The operation of bleed of the stabilizing system at conduit 159 controlled by valve 160 occurs after the weighbeam is restored to balance with the valve 160 being set to compensate for the storage lag in the process being controlled.

We claim:

1. In combination, a floating regulator including an element responsive to fluid pressure and adapted to be actuated in response to a variable element of a process to be controlled, means for connecting said regulator with said element, an electrical power unit controlled by the pressure responsive element of said regulator, a stabilizer for said regulator comprising a fluid pressure generator actuated and controlled solely by said power unit, means applying pressure from said generator to said pressure responsive element, whereby said fluid pressure constitutes the sole means opposing the initial actuating variation to restore said regulator to balance, and means for bleeding off said fluid pressure.

2. In combination, a normally balanced regulator including a diaphragm and adapted to be actuated in response to an unbalancing variation in either of two elements of a process to be controlled, means for connecting said regulator with said elements, an electrical power unit controlled by said regulator diaphragm for actuating a control element of the process to be controlled, a fluid pressure generator actuated and controlled solely by said power unit, means for impressing said fluid pressure in rebalancing relation upon the diaphragm, said fluid pressure constituting the sole means to rebalance the regulator, and means for dissipating said fluid pressure at a controlled rate during reestablishment of a balanced condition in the first mentioned elements.

3. The combination with a normally balanced regulator comprising a housing having a diaphragm, a fluid line communicating with said housing on one side of said diaphragm, a pivoted lever actuated by said diaphragm, electrical switch means controlled by said lever, a reversible electric power member controlled by said switch means, means normally balancing the pressure in said line for maintaining said diaphragm in neutral position, said diaphragm being shifted responsive to variations either in said last named means or in said fluid line, of a fluid pressure generator actuated by said power member, means for impressing the pressure condition created by said generator upon said diaphragm to rebalance said diaphragm, and means for dissipating said fluid pressure from said generator while equilibrium is restored between the pressure in said line and said balancing means responsive to operation of said power member.

4. In combination, a normally balanced regulator including a diaphragm and adapted to be actuated in response to an unbalancing variation in an element of a process to be regulated, means for connecting said regulator with said element, an electrical power unit controlled by said regulator for actuating said control element of the process to be regulated, a cylinder, a piston shiftable in said cylinder by said power unit, a fluid system connecting said cylinder and said regulator at said diaphragm and constituting the sole means for counterbalancing said variation, and a bleed valve in said fluid system.

5. In combination, a normally balanced regulator including a diaphragm and adapted to be actuated in response to an unbalancing variation of an element of a process to be regulated, means for connecting said regulator with said element including a conduit for applying a pneumatic action on said regulator diaphragm, a control valve regulating air flow through said conduit, a power unit controlled for operation in either of two directions by said regulator and adapted to actuate said control element of the process to be regulated, a pneumatic pump actuated by said power unit to create a positive air pressure upon operation in one direction and a negative air pressure upon operation in the other direction, and a conduit connecting said pump and a point of said first conduit between said valve and said regulator.

6. In combination, a regulator including a chamber containing a diaphragm and having differential pressure connections on opposite sides of the diaphragm, means for connecting said regulator with variable means normally balancing said differential pressure, a reversible power unit controlled by said regulator diaphragm, a fluid pressure system connected with said diaphragm chamber on the metering side thereof, and means actuated by said power unit for creating and temporarily maintaining a pressure condition in said system stabilizing said regulator and rebalancing said diaphragm after deflection of said diaphragm.

7. In combination, a normally balanced regulator including a diaphragm and adapted to be actuated in response to an unbalancing variation in an element of a process to be regulated, means for connecting said regulator with said element, an electrical power unit controlled by said regulator diaphragm for actuating said control element of the process to be regulated, a cylinder, a piston shiftable in said cylinder by said power unit, a stabilizing chamber open to atmosphere, a valve restricting said opening to atmosphere, and a fluid line connecting said cylinder, chamber and regulator.

FRANK DONALD BURNS.
WARREN B. THORNE.